United States Patent
Holt et al.

(10) Patent No.: US 9,632,758 B2
(45) Date of Patent: Apr. 25, 2017

(54) SYSTEM AND METHOD FOR GENERATING CONTENT RULES FOR A WEBSITE

(75) Inventors: Alexander W. Holt, New Paltz, NY (US); Michael E. Moran, Ridgewood, NJ (US); Jeffrey S. Schaffer, Ridgefield, CT (US)

(73) Assignee: International Business Machines Corporation, Armonk, NY (US)

( * ) Notice: Subject to any disclaimer, the term of this patent is extended or adjusted under 35 U.S.C. 154(b) by 2399 days.

(21) Appl. No.: 11/210,615

(22) Filed: Aug. 24, 2005

(65) Prior Publication Data

US 2007/0050753 A1    Mar. 1, 2007

(51) Int. Cl.
*G06F 9/44*      (2006.01)
*G06Q 30/02*    (2012.01)

(52) U.S. Cl.
CPC .............. *G06F 8/38* (2013.01); *G06Q 30/02* (2013.01)

(58) Field of Classification Search
None
See application file for complete search history.

(56) References Cited

U.S. PATENT DOCUMENTS

| | | | |
|---|---|---|---|
| 6,330,575 B1* | 12/2001 | Moore et al. | 715/234 |
| 2001/0039594 A1 | 11/2001 | Park et al. | |
| 2001/0052112 A1 | 12/2001 | Mohan et al. | |
| 2002/0035584 A1 | 3/2002 | Scheier et al. | |
| 2002/0059327 A1 | 5/2002 | Starkey | |
| 2003/0041050 A1* | 2/2003 | Smith et al. | 707/1 |
| 2003/0120659 A1* | 6/2003 | Sridhar | 707/100 |
| 2003/0135543 A1 | 7/2003 | Kittredge et al. | |
| 2003/0172085 A1* | 9/2003 | Rajasekaran | G06F 17/30949 707/999.102 |
| 2004/0111424 A1 | 6/2004 | Roman et al. | |
| 2004/0143591 A1 | 7/2004 | Onyeabor | |
| 2005/0209932 A1* | 9/2005 | Hui | 705/27 |
| 2006/0229896 A1* | 10/2006 | Rosen | G06Q 10/1053 705/321 |

* cited by examiner

*Primary Examiner* — Qamrun Nahar
(74) *Attorney, Agent, or Firm* — Daniel Simek; Hoffman Warnick LLC (57) ABSTRACT

A system and method for generating content rules for a Web application server. A system is provided that includes a content manager for selecting a content item; and a segment manager for defining a data segment to associate with a selected content item, wherein the segment manager includes a multifaceted search interface for defining the data segment.

24 Claims, 12 Drawing Sheets

Business Rules Wizard

Define an Audience Segment

>> Customer Type: Business

No. of Employees
1-10 (2,000)
11-50 (1,500)
51-100 (1,500)  ← 72
100-1,000 (920)
Over 1,000 (80)

Order history
Phone systems (2,000)
Multi-line phones (5,000)
Single-line phones (5,000)
Warranties (5,000)

Results from Profile Database

1 to 10 of 6,000 customers | Next>

Aaron, Tommy
Business    KEW Industries  236 Lincoln Place, Montclair

Ackerman, Edward
Business    Kodak  1400 Kodak Road, Rochester NY 146

Ackerman, Robert
Business    Envirochem  11 McNeil Place, Falls River MA

Marketing Plans
Content
Segments
Placement

Business Rules Wizard

Define an Audience Segment

Segment: Customer Type = Business
No. of Employees = 51-100,
100-1,000, Over 1,000

Size:   2,500 customers

[ Save Segment ] — 80

Customer Type
- ✓ Business (6,000)
- ☐ Consumer (19,000)

No. of Employees
- ☐ 1-10 (2,000)
- ☐ 11-50 (1,500)
- ✓ 51-100 (1,500)
- ✓ 100-1,000 (920)
- ✓ Over 1,000 (80)

Order history
- ☐ Phone systems (12,000)
- ☐ Multi-line phones (15,000)
- ☐ Single-line phones (25,000)
- ☐ Warranties (15,000)

Customer state
- ☐ California (3,000)
- ☐ Texas (2,200)
- ☐ New York (1,400)
- ☐ Florida (800)
- ☐ New Jersey (550)
- ☐ Massachusetts (540)
- ☐ Illinois (480)
- ☐ Ohio (460)

Marketing Plans
Content
Segments
Placement

SYSTEM AND METHOD FOR GENERATING CONTENT RULES FOR A WEBSITE

BACKGROUND OF THE INVENTION

1. Technical Field

The present invention relates generally to Website development environments, and more specifically relates to a system and method for providing a user interface that will give non-technical people the ability to generate application logic for dynamic content selection by using data within a multifaceted search engine and export rules to a Web application server.

2. Related Art

The process of utilizing Websites to collect, manage and exploit data is recognized as an important commercial resource form many enterprises. For instance, if the enterprise knows certain demographics or history about a site visitor logged into their Web portal, the enterprise would ideally like to have a system that can display the most effective content for that user. One of the challenges for such enterprises is that while the business people tend to understand and know how to exploit the data, the technical people tend to control the data and the implementation of the Website. Thus, for example, while a business person may be able to examine user data, such as sales history, and determine the best content and ad placement for a given Web page, the business person cannot implement such rules without interfacing with a technical specialist. This process severely limits the effectiveness of the business person, who may need to analyze and refine such rules in an ongoing and timely fashion.

One method of addressing this problem is to provide a rules-based Website interface that gives non-technical people the ability to control the dynamic display content for their Web pages. Unfortunately, the promise of developing Websites based on rules is largely unfilled because present day systems continue to require skills normally possessed by programmers rather than business people. These skills include developing if-than-else and case-based logic as well as requiring in depth understanding of the nature of the data and data model. In addition, a deep understanding of the data is required to develop matching rules to ensure that relevant content exists for each rule. Such knowledge is only typically gained through programmatic access to the data such as use of SQL or other similar query languages. Currently rules definition facilities are considered "development environments" and are modeled after facilities that programmers use to develop software. Existing rules creation mechanisms provide an environment where the rule must first be coded, run, potentially debugged, and then deployed. This creates a significant impediment to business users creating rules. An example of this type of solution is the current rules wizard inside the WEBSPHERE™ Portal Server.

Accordingly, a need exists for a Website development environment that will allow non-technical people to effectuate changes to the Website by exploiting data associated with the enterprise.

SUMMARY OF THE INVENTION

The present invention addresses the above-mentioned problems, as well as others, by providing a user interface that will give non-technical personnel (i.e., business users) the ability to exploit data by utilizing a multifaceted search engine and export rules to a Web application server. The invention defines a system that allows these non-technical personnel to explore data and create business rules for portal behavior using an interface that they can understand. The system provides a data navigation interface that uses a multifaceted search engine to expose the attributes, values and aggregates using a cognitive model for their display. Business rules can then be constructed using attribute values selected during the data exploration without additional technical manipulation.

The use of a multifaceted search engine within the interface not only exposes the data and meaning within it, but it also incrementally creates business rules as the user selects each attribute value. At the same time, the interface allows the user to see the potential effect the rule will have on the Website. When the user selects an attribute that causes a rule to be implemented, the user can see both how many visitors will potentially be included and excluded. The present invention can also expand on a rule by further segmentation of the remaining audience since the use of a multifaceted search engine allows the user to intuitively navigate the remaining attributes.

In a first aspect, the invention provides a system for generating content rules for a Web application server, comprising: a content manager for selecting a content item; and a segment manager for defining a data segment to associate with a selected content item, wherein the segment manager includes a multifaceted search interface for defining the data segment.

In a second aspect, the invention provides a program product stored on a computer readable medium for generating content rules for a Web application server, comprising: program code configured for generating a first user interface for selecting a content item; and program code configured for generating a second user interface for defining a data segment to associate with a selected content item, wherein the second user interface includes a multifaceted search interface for defining the data segment.

In a third aspect, the invention provides a method for generating content rules for a Web application server, comprising: selecting a content item within a user interface; defining a data segment to associate with a selected content item by examining a multifaceted search interface that provides user data from a database associated with the Web application server; and generating at least one rule for the Web application server based on the selected content item and data segment.

In a fourth aspect, the invention provides a method for deploying an application for generating content rules for a Web application server, comprising: providing a computer infrastructure being operable to: generate a first user interface for selecting a content item; and generate a second user interface for defining a data segment to associate with a selected content item, wherein the second user interface includes a multifaceted search interface for defining the data segment.

In a fifth aspect, the invention provides computer software embodied in a propagated signal for generating content rules for a Web application server, the computer software comprises instructions to cause a computer to perform the following functions: generate a first user interface for selecting a content item; and generate a second user interface for defining a data segment to associate with a selected content item, wherein the second user interface includes a multifaceted search interface for defining the data segment.

In a sixth aspect, the invention provides a system for generating rules to control a behavior of a computer application, comprising: a system for selecting a behavior; an interface to a data store having information relating to the computer application; and a multifaceted search engine for allowing a user to navigate the data store to create rules for the computer application to control the selected behavior based on a state of the application.

BRIEF DESCRIPTION OF THE DRAWINGS

These and other features of this invention will be more readily understood from the following detailed description of the various aspects of the invention taken in conjunction with the accompanying drawings in which.

DETAILED DESCRIPTION OF THE INVENTION

The illustrative embodiments described herein generally relate to generating content rules for a Web application server based on data segments defined using a multifaceted search engine. However, it should be understood that the invention is not necessarily limited to such an embodiment. Namely, the invention may comprise a system for generating rules for any type of behavior of any type of computer application based on information acquired via a multifaceted search engine.

For instance, the invention could be utilized to generate rules for a telephone VRU (voice response unit) to deliver dynamic content in a non-web environment. In such an embodiment, when a user calls into the VRU, the entire user experience could be dynamically generated based on a business rule for the user's phone number (e.g., known from caller id). In another embodiment, the invention could apply to generating rules for an on-line music service or radio service that delivers a different set of dynamic content to system users programmatically based on a rule generated for the specific user. Moreover, the invention could involve processes that not only deliver dynamic content, but that involves any dynamic system state. For instance, in the case of a highly available Website, rules could be created to handle changes in traffic to the Website to cause site change behavior, or request additional resources. Thus, for the purposes of this invention, the system state could refer to not only delivering dynamic content based on the identity of the user, but can also refer to any dynamic operation of the computer application.

Figure 1:
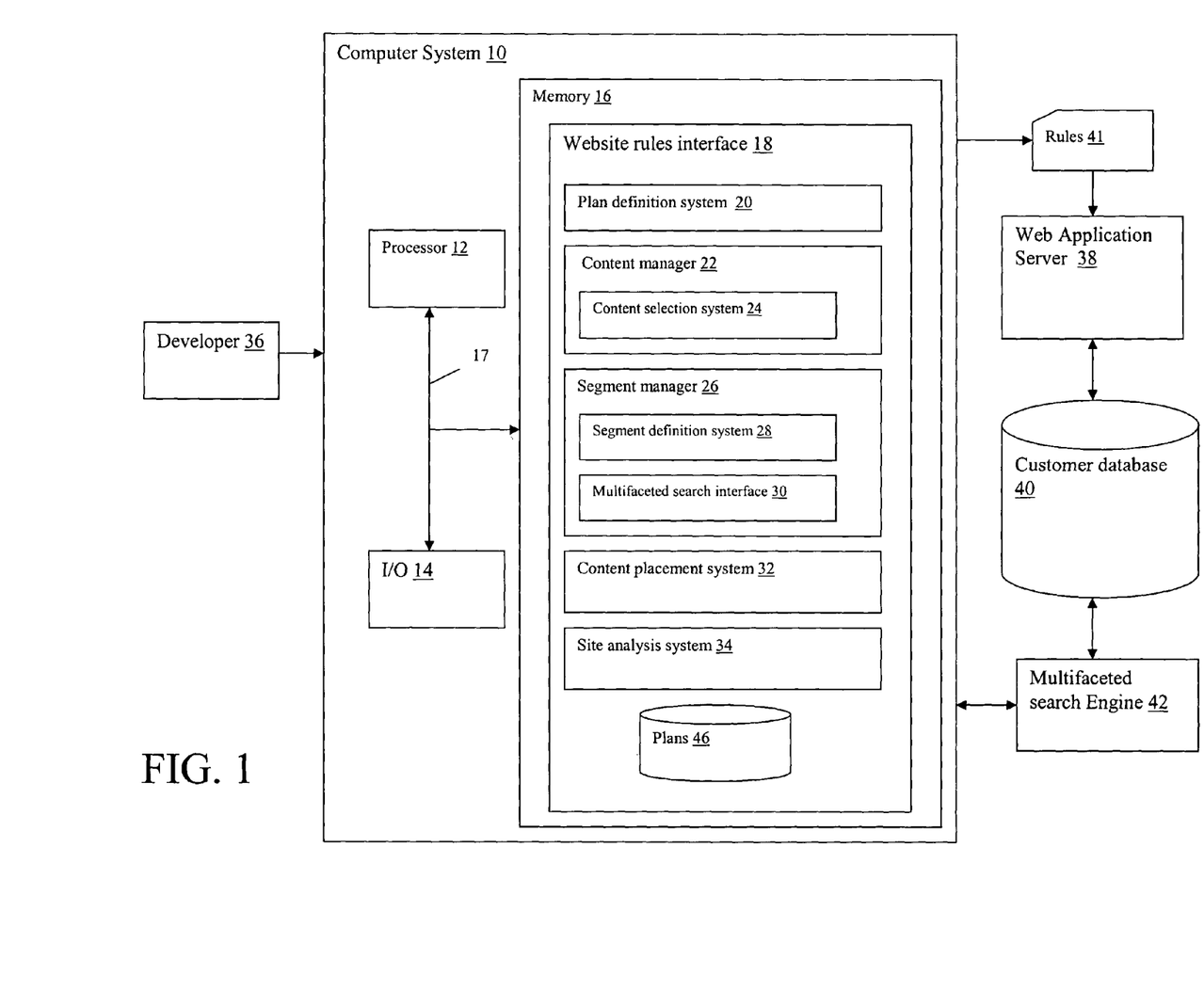
FIG. 1 depicts a computer system having Website rules interface in accordance with an embodiment of the present invention.

Referring to drawings, FIG. 1 depicts a computer system 10 having a Website rules interface 18 for generating content rules ("rules") 41 for a Web application server 38 (e.g., that provides a Web portal, a Website, etc.). In general, rules 41 dictate what content will appear on a given Web page based on attributes of the visitor signed onto/recognized by the Web application server 38.

Website rules interface 18 allows a business user 36 to develop plans 46 (e.g., a marketing plan) that associate content for a Website with different segments of visitors. Each plan provides a set of (i.e., one or more) rules 41 that are loaded to the Web application server 38. As described in further detail below, Website rules interface 18 includes a plan definition system 20 for defining a new plan (i.e., set of rules), a content manager 22 for selecting and managing content (via a content selection system 24) to appear on the Website in conjunction with an associated plan, a segment manager 26 for selecting and managing data segments from the application data stored in a database 40 for a given plan (via a segment definition system 28), a content placement system 32 for placing selected content within a given Web page, and a site analysis system 34 for analyzing performance of a given plan.

Included in Website rules interface 18 is a multifaceted search interface 30 that allows the business user 36 to interface with a multifaceted search engine 42. Multifaceted search engine 42 may be implemented separately from the Website rules interface 18 (as shown) or could be integrated therein. Illustrative multifaceted search engines, which are well understood in the art, include ENDECA PROFIND™ and FAST DATA SEARCH™. In the illustrative embodiments described herein, the multifaceted search engine 42 includes both multifaceted and text search capabilities, and includes an application programming interface (API) that accepts queries and returns results. Data from the visitor database 20 is indexed from the data sources to be used in rules generation. As described below with reference to FIGS. 2-12, a business rules wizard containing various user interfaces is provided that exposes the data indexes in the multifaceted search engine 42 and then exports rules 41 to the Web application server 38.

Web Application Server 38 may comprise any type of Web server, such as WEBSPHERE APPLICATION SERVER™, BEA WEBLOGIC™, MS SHAREPOINT™, or SUN JAVA SYSTEM PORTAL SERVER™, etc., which can provide dynamic Web pages to the site visitors. In general, such a server typically includes one or more programmatic interface (such as Java, PERL, Python, etc.) for rendering dynamic content.

In general, computer system 10 may comprise, e.g., a desktop, a laptop, a workstation, a handheld device, etc. Moreover, computer system 10 could be implemented as part of a client and/or a server. Computer system 10 generally includes a processor 12, input/output (I/O) 14, memory 16, and bus 17. The processor 12 may comprise a single processing unit, or be distributed across one or more processing units in one or more locations, e.g., on a client and server. Memory 16 may comprise any known type of data storage, including magnetic media, optical media, random access memory (RAM), read-only memory (ROM), a data cache, a data object, etc. Moreover, memory 16 may reside at a single physical location, comprising one or more types of data storage, or be distributed across a plurality of physical systems in various forms.

I/O 14 may comprise any system for exchanging information to/from an external resource. External devices/resources may comprise any known type of external device, including a monitor/display, speakers, storage, another computer system, a hand-held device, keyboard, mouse, voice recognition system, speech output system, printer, facsimile, pager, etc. Bus 17 provides a communication link between each of the components in the computer system 10 and likewise may comprise any known type of transmission link, including electrical, optical, wireless, etc. Although not shown, additional components, such as cache memory, communication systems, system software, etc., may be incorporated into computer system 10.

Access to computer system 10 may be provided over a network such as the Internet, a local area network (LAN), a wide area network (WAN), a virtual private network (VPN), etc. Communication could occur via a direct hardwired connection (e.g., serial port), or via an addressable connection that may utilize any combination of wireline and/or wireless transmission methods. Moreover, conventional network connectivity, such as Token Ring, Ethernet, WiFi or other conventional communications standards could be used. Still yet, connectivity could be provided by conventional TCP/IP sockets-based protocol. In this instance, an Internet service provider could be used to establish interconnectivity. Further, as indicated above, communication could occur in a client-server or server-server environment.

Figure 2:
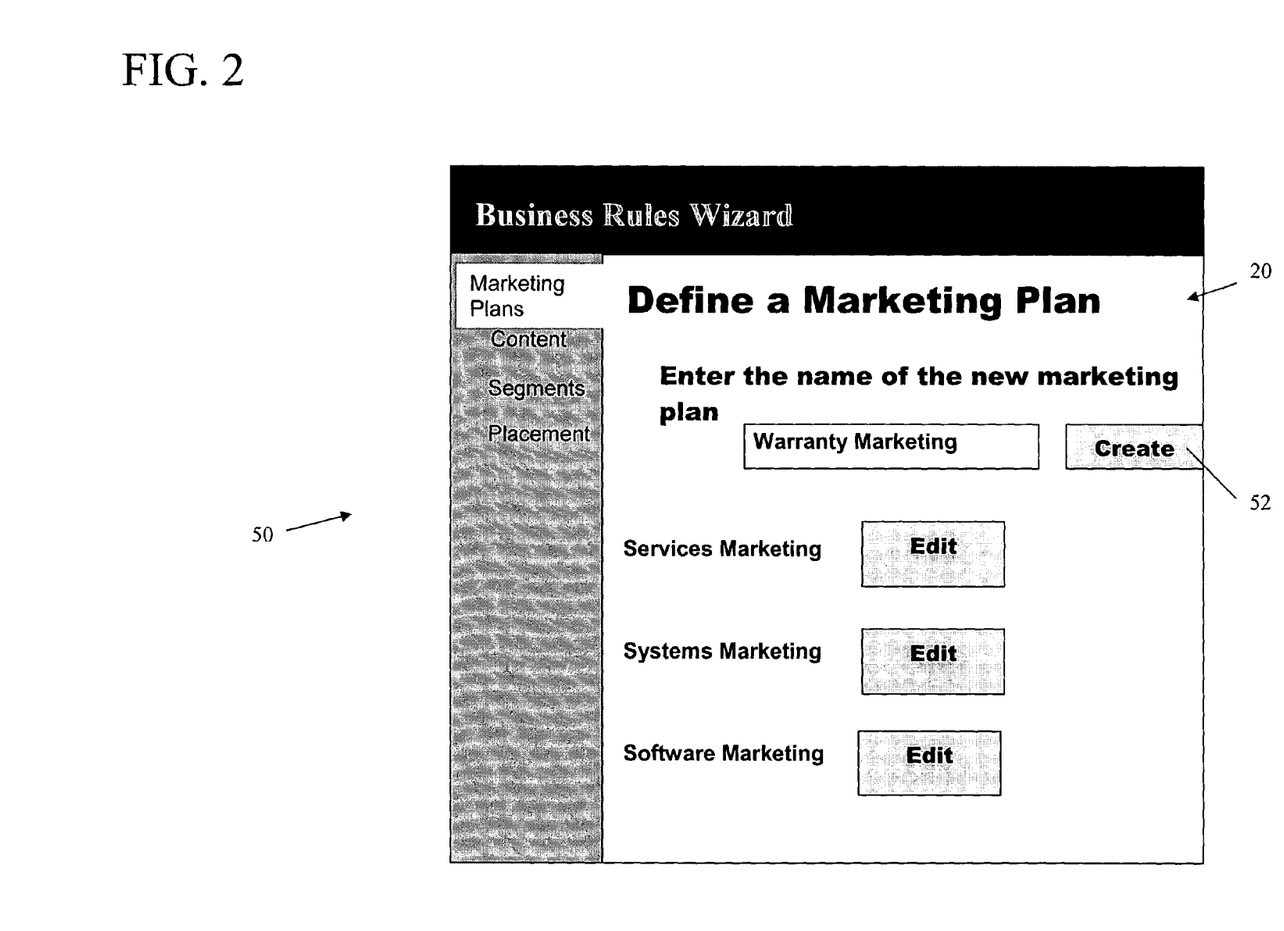
FIG. 2 depicts a plan definition interface in accordance with an embodiment of the present invention.
Figure 3:
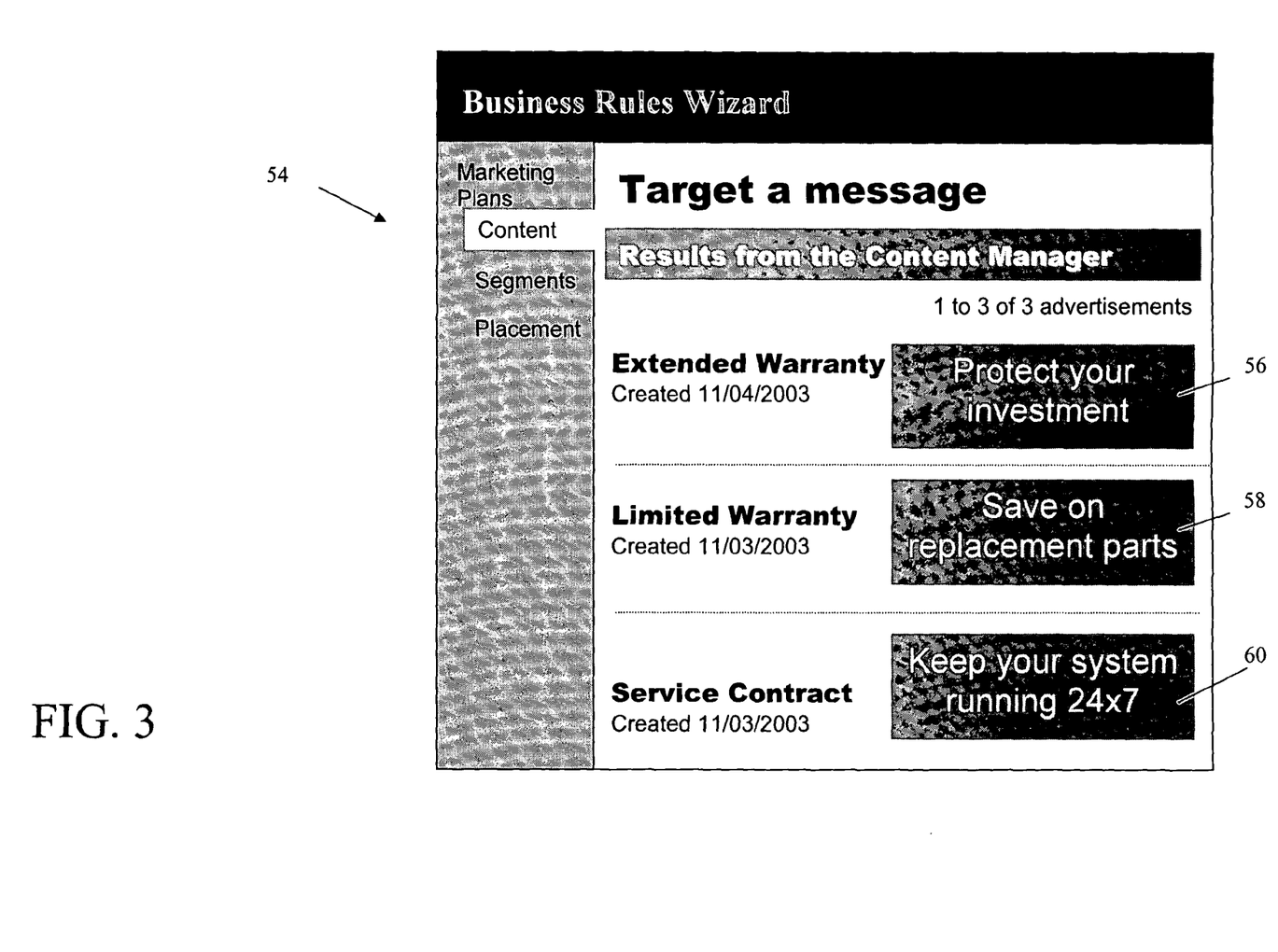
FIG. 3 depicts a content definition interface in accordance with an embodiment of the present invention.

FIGS. 2-12 depict an illustrative embodiment of a Website rules interface 18 that is implemented as a business rules wizard 50. As can be seen in FIG. 2, the business rules wizard 50 includes a plan definition system 20 that allows the business user 36 to create or edit marketing plans for a Web portal that has collected customer data in a customer database. In this example, the business user 36 has chosen to create a new warranty marketing plan. Upon selecting the create button 52, the business user 36 is taken to a content selection interface 54 within the content manager 22, as shown in FIG. 3. In this interface 54, the business user 36 can select a content item from a list of content items 56, 58, 60 (e.g., an advertisement) they want on Web page in the portal. Note that while this embodiment involves content items that are advertisements, the content item may comprise any type of information or data, including, e.g., text, an image, multimedia, an RSS feed, etc.

Figure 4:
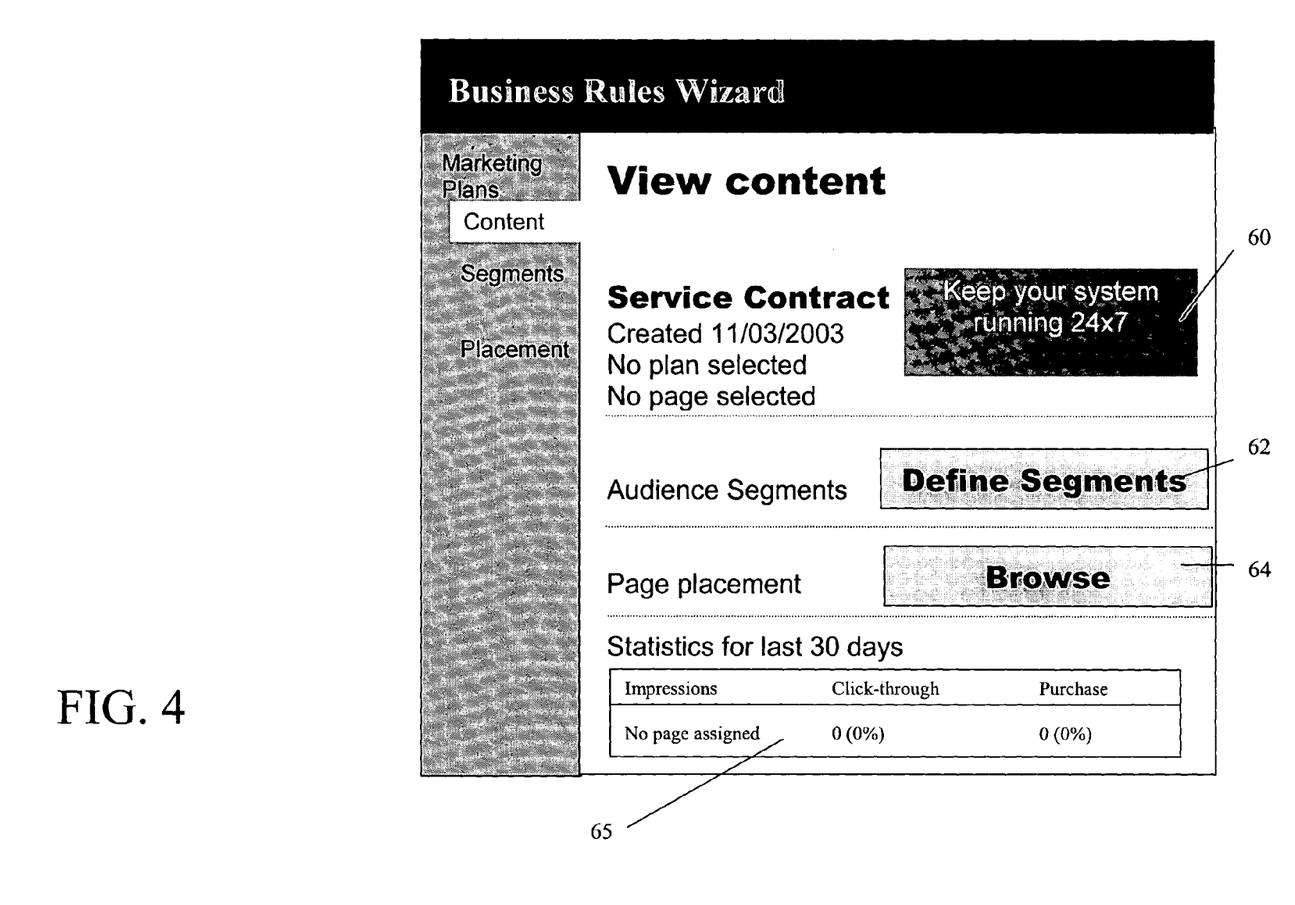
FIG. 4 depicts a second content definition interface in accordance with an embodiment of the present invention.

In this example, the business user 36 has chosen the "service contract" content item 60, which is then displayed in the content manager 22 as shown in FIG. 4. From this page, the business user 36 can either define segments 62 for the content item 60, or browse 62 the portal to determine where to place the content item 60. Also available on this page is a Website analysis system 34 that provides a chart 65 showing statistics for the content item 60. In this case, since the content item 60 has not yet been placed, there are no available statistics. However, as the statistics are gathers over time (e.g., customers click on a link associated with the content item 60 or purchase goods/services associated with the content item), Website analysis system 34 will update the chart 65. In addition, although not shown, the chart 65 may include further details (e.g., statistics for different groups within a defined segment, statistics for each plan, for each defined segment, etc.).

Figure 5:
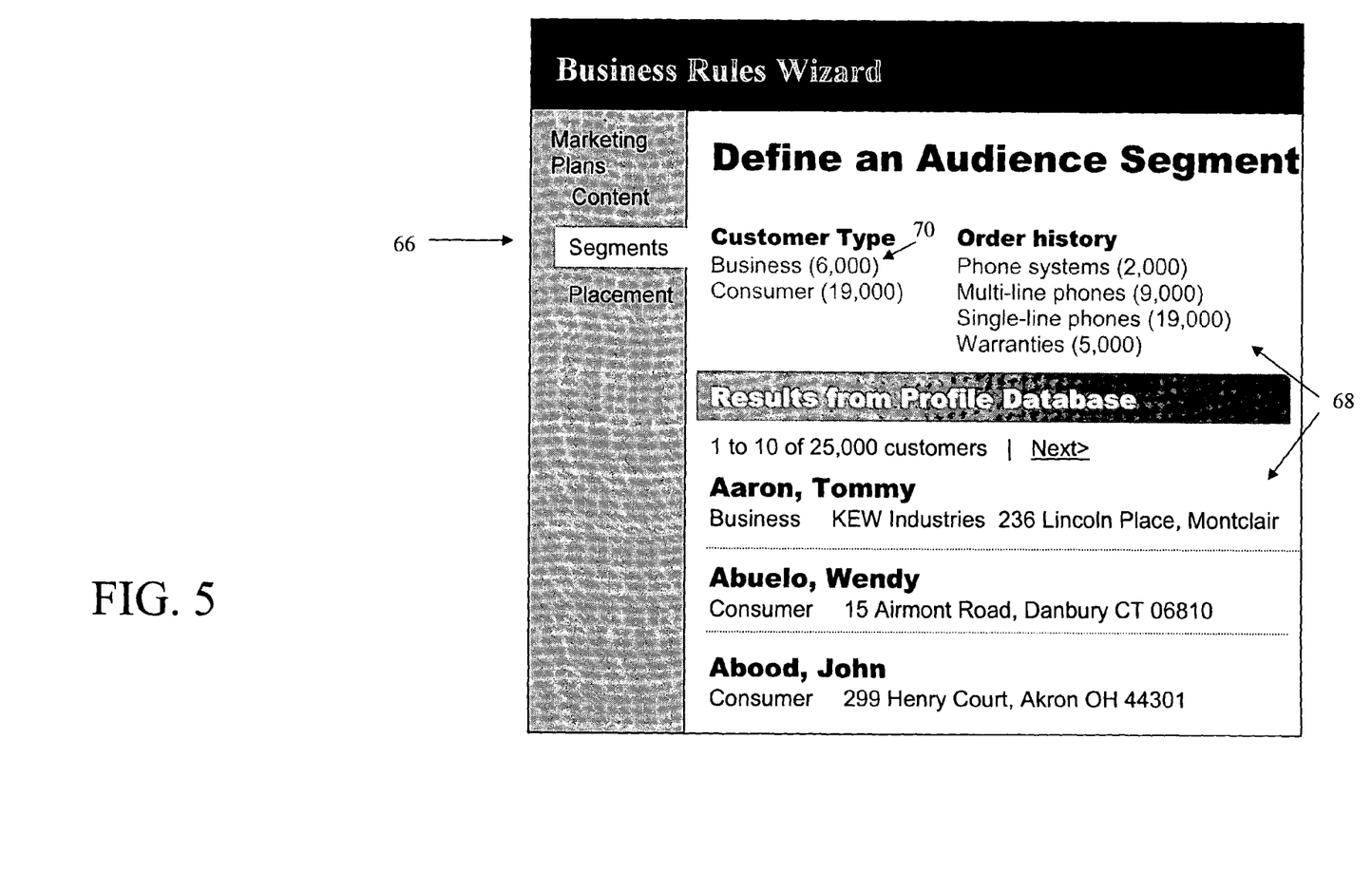
FIG. 5-11 depict various segment definition interfaces in accordance with an embodiment of the present invention.

If the business user 36 selects the define segments 62 option, the business user 36 is brought to a segment definition interface 66 in the segment manager 26, as shown in FIG. 5. As can be seen, the segment definition interface 66 includes a multifaceted search interface 30 that is linked into a multifaceted search engine 42. In this example, the multifaceted search interface 30 breaks down all visitors (in this case, "customers") of the Website portal by customer type and order history. In addition, multifaceted search interface 30 lists each of the customers defined in the breakdowns by alphabetical order. In this example, it can be seen that there are 25,000 customers, namely, 6,000 business and 19,000 consumer. Note that while this embodiment describes a system for defining data segments involving customers, the segment definition interface 66 could be utilized to define any type of data segment. For example, it could define segments based on metrics or price data, e.g., which type of purchases have the highest profit margins, best user satisfaction, etc.

Figure 6:
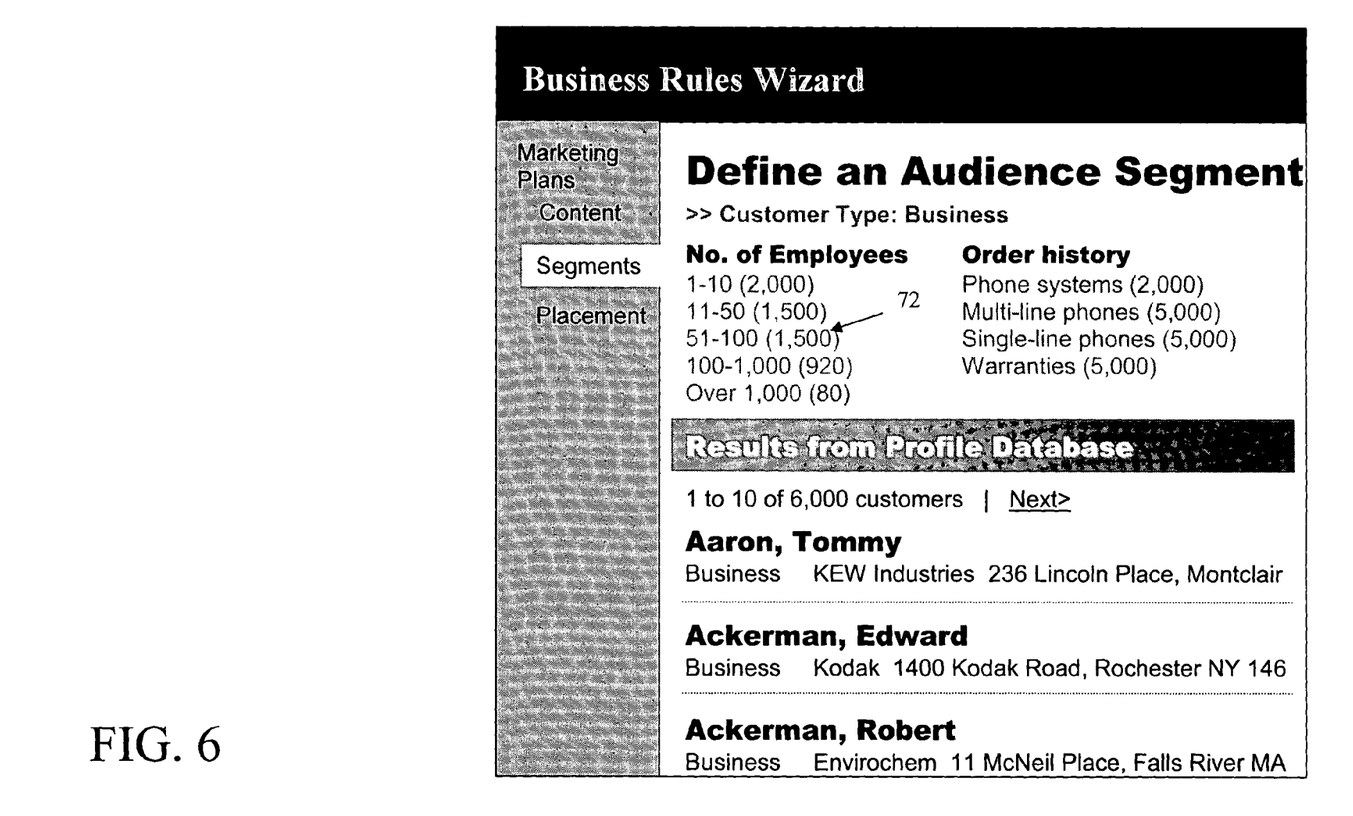
Figure 7:
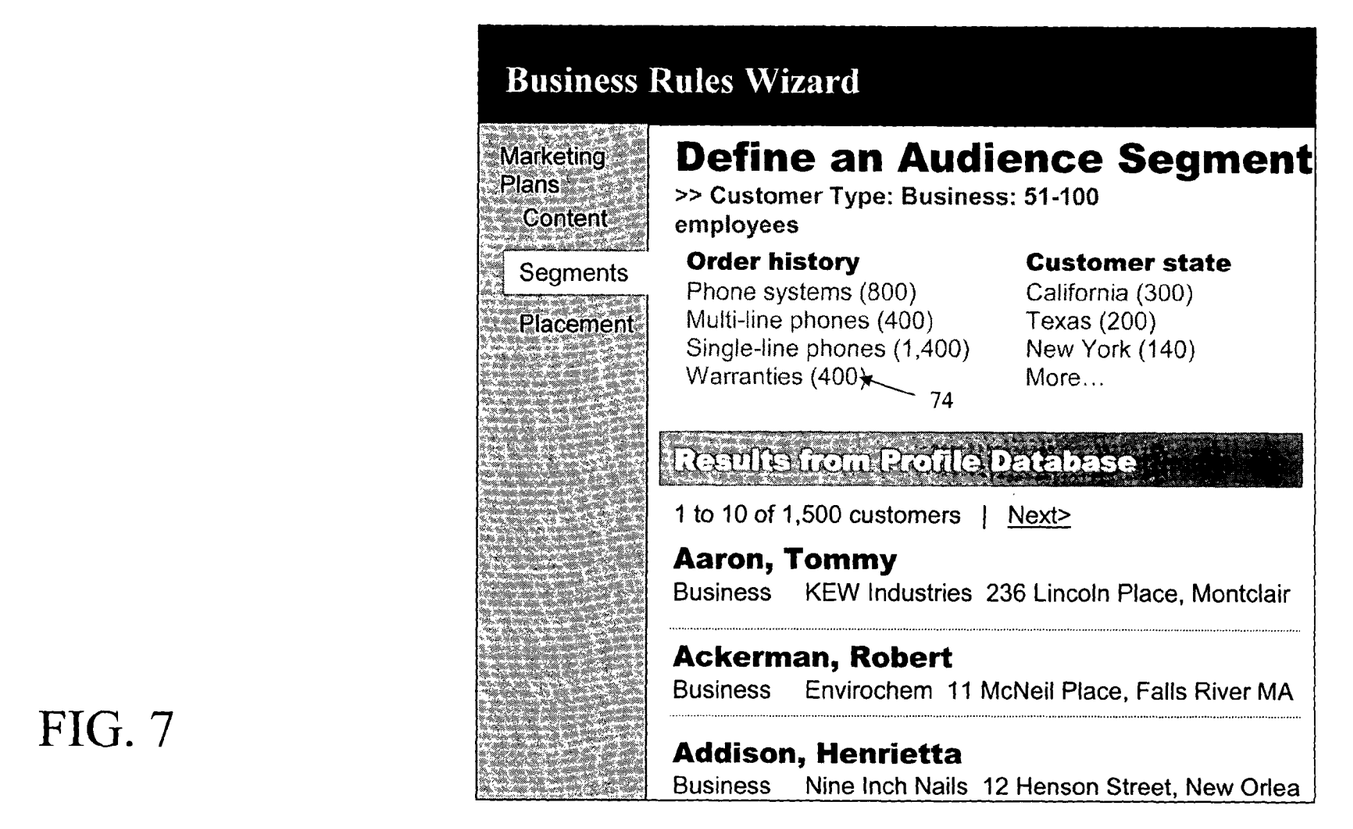
Figure 8:
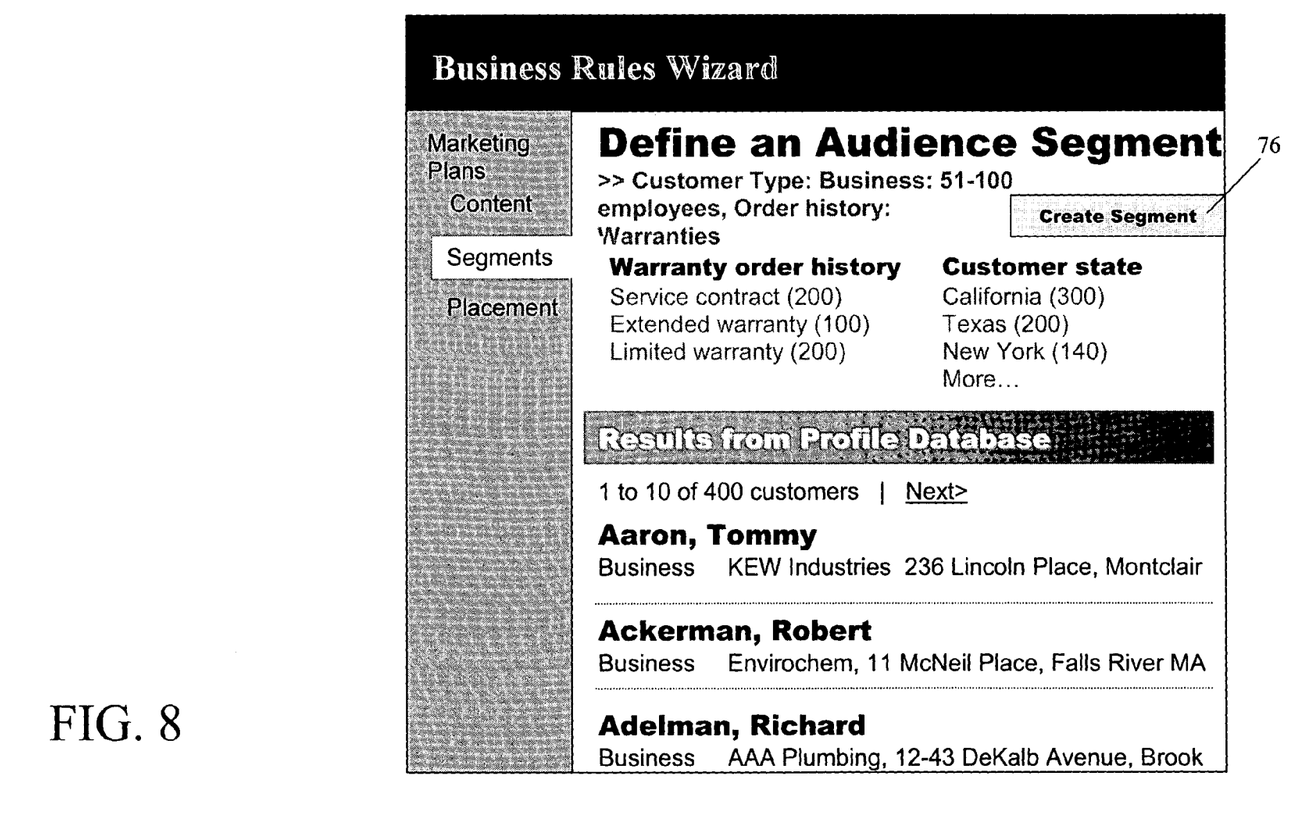

Assuming the business user 36 is only interested in business customers, the business user 36 can click on the business link 70, which will further breakdown the customers, as shown in FIG. 6, in accordance with predetermined attributes defined for the multifaceted search engine 42. In this example, the multifaceted search interface 30 breaks down the 6,000 business customers by number of employees and order history. Assuming the business user 36 was interested in businesses having 51-100 employees, the business user 36 would click on the link 72, which would further break down those 1,500 customers by order history and customer state as shown in FIG. 7. From here, the business user 36 may select the warranty link 74, which would further breakdown the 400 warranty customers, as shown in FIG. 8. At any time during the process, the business user 36 may decide to create a segment for the selected content item 60 by selecting the create segment button 76.

Figure 9:
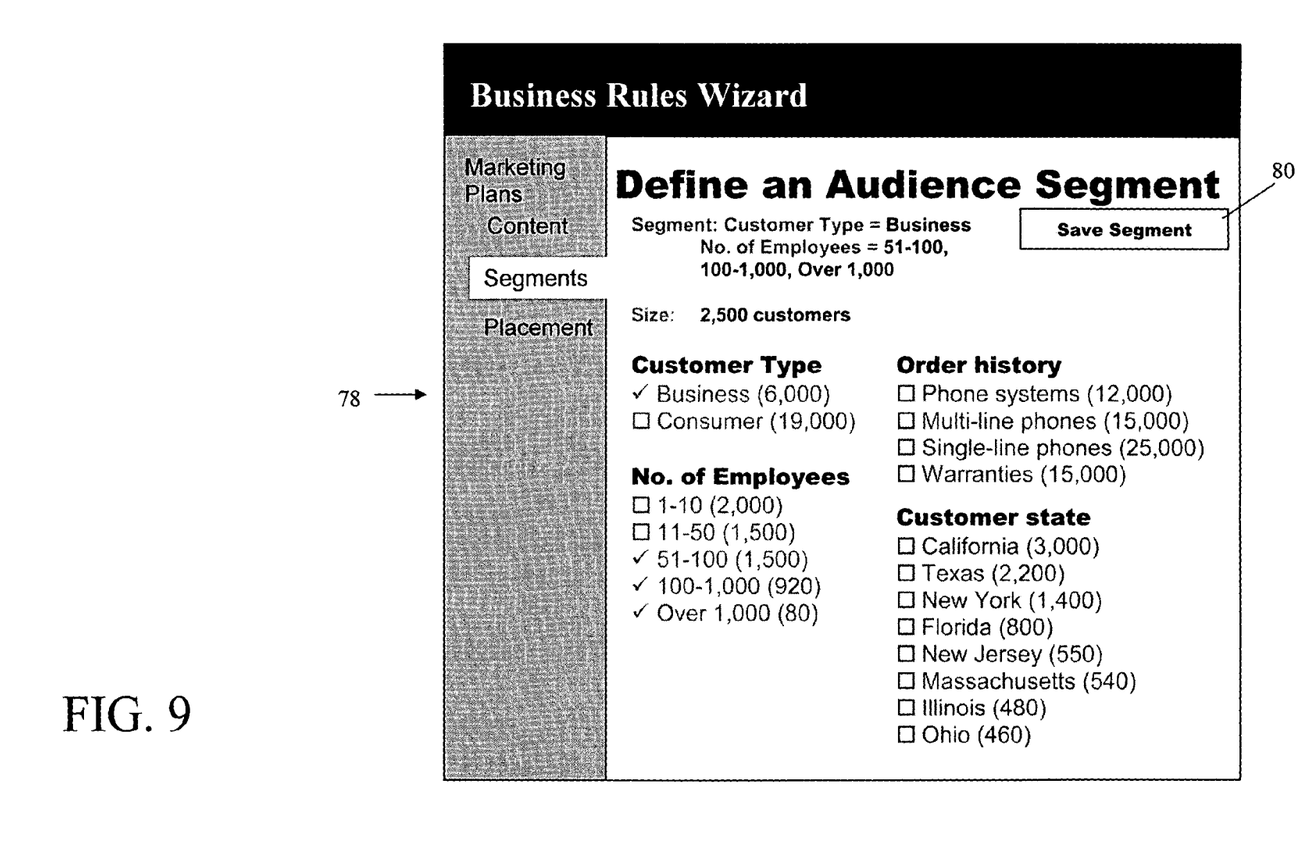
Figure 10:
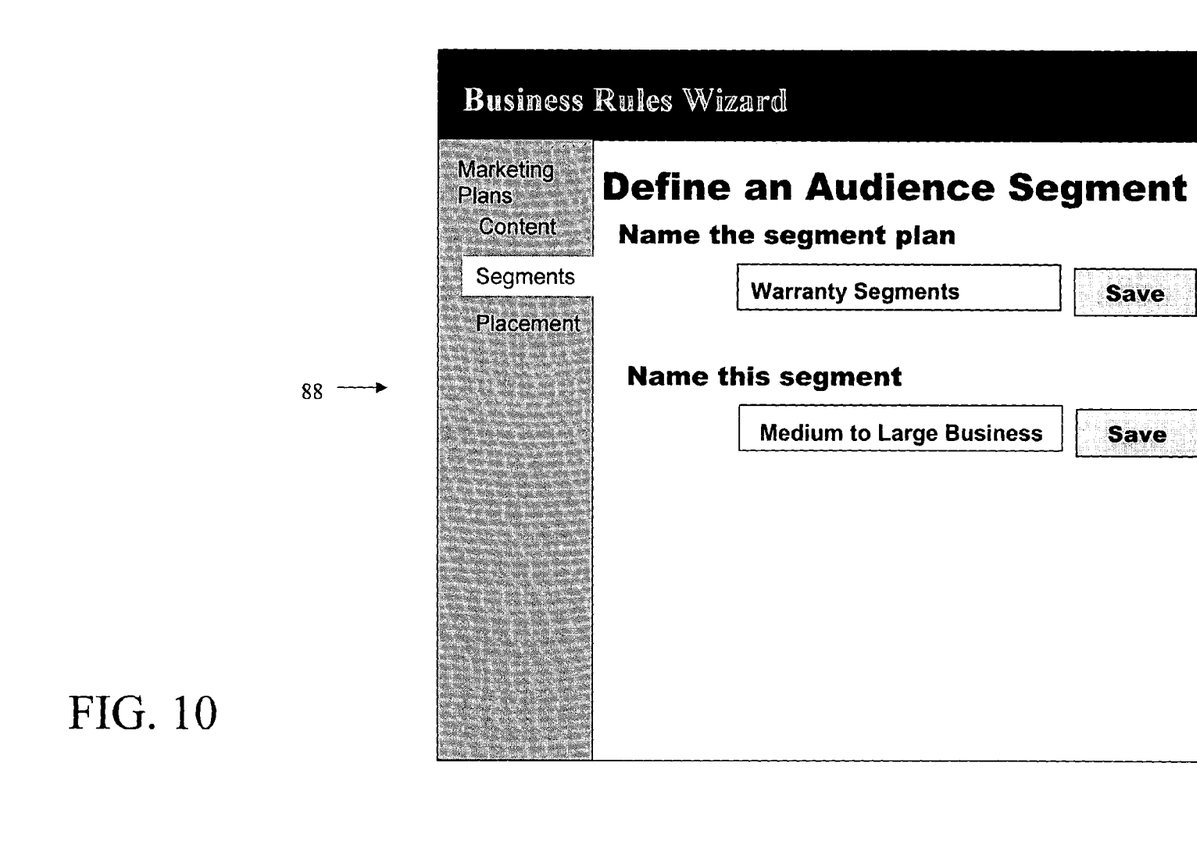
Figure 11:
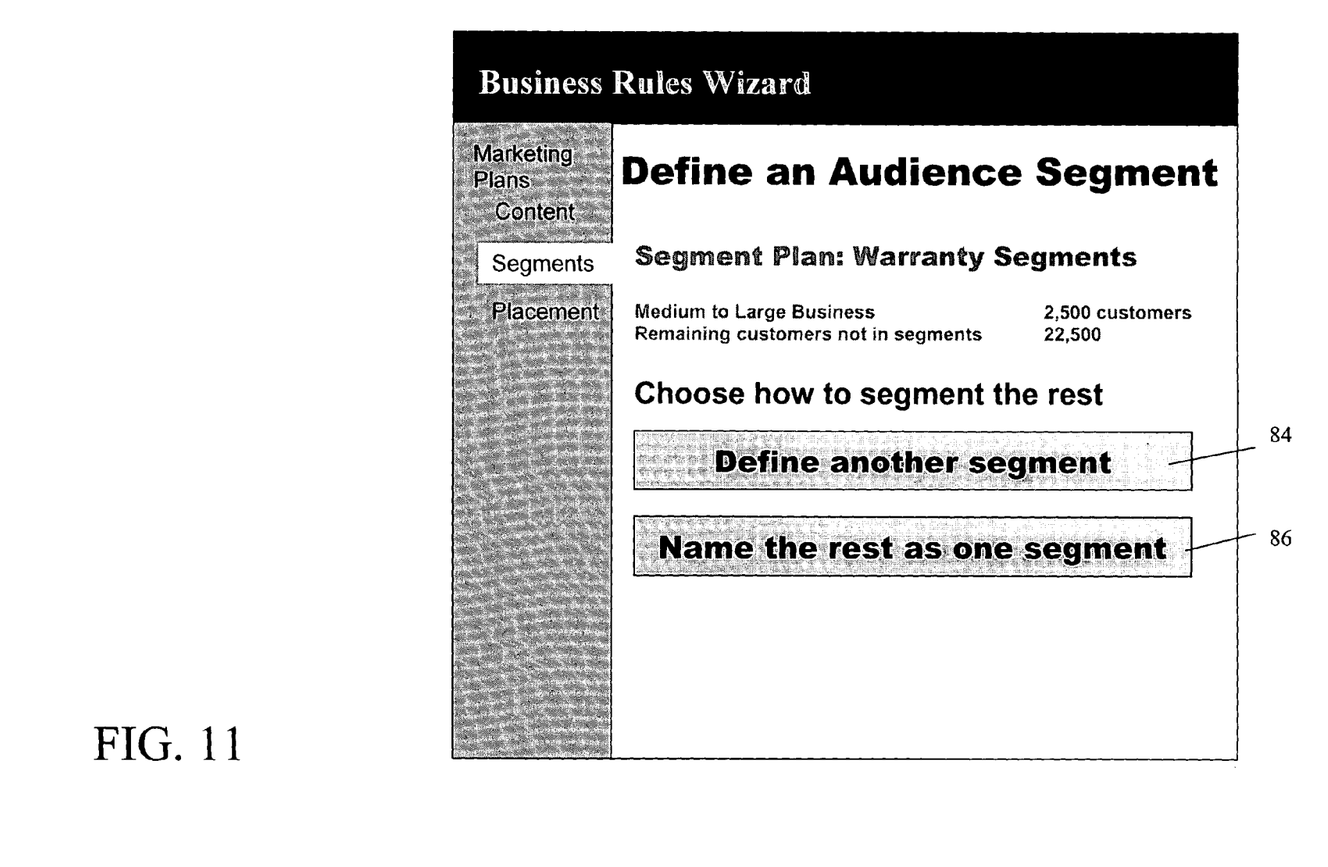

The create segment button 76 would then cause an overview page 78 to appear in which the business user 36 could check the boxes they want included in the segment as shown in FIG. 9. Once the appropriate selections are made, the business user 36 can select the save segment button 80, which will bring up a naming interface as shown in FIG. 10, where a name for the segment plan and segment can be made. FIG. 11 provides options to define another segment 84 or "name the rest as one segment" 86. When the "name the rest as one segment" 86 button is selected, the business user 36 is able to place all other customers not currently assigned to segments in a newly defined segment. This alleviates the need to go back through and manually create a segment for those unassigned customers.

Figure 12:
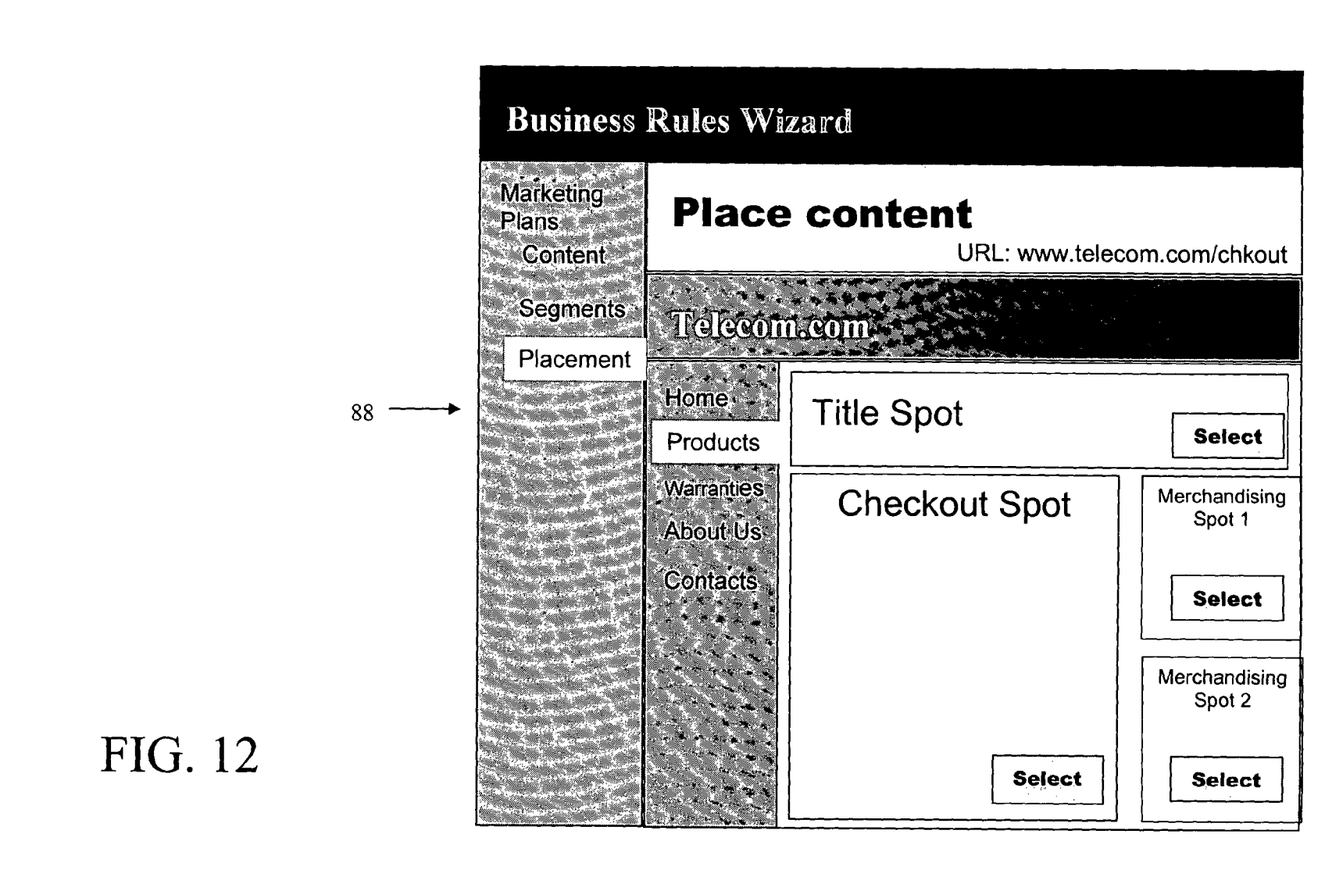
FIG. 12 depicts a content placement interface in accordance with an embodiment of the present invention.

FIG. 12 depicts an interface 88 for the content placement system 32, which allows the user to select a Web page and location for the selected content item 60. At this point, the business rules wizard 50 can export a set of rules 41 associated with the created plan to the Web application server 38. Once the rules 41 are imported, the content item 60 will appear on the Web page for customers who fall into the defined segment. After some time, the business user 36 can utilize the Website analysis system 34 to review performance (as shown in FIG. 4) of the selected content item/segment. If the content item 60 (e.g., ad) is not receiving enough hits or sales, the business user 36 can redefine the segment or change the content item in an effort to improve efficiency.

It should be appreciated that the teachings of the present invention could be offered as a business method on a subscription or fee basis. For example, a computer system 10 comprising a Website rules interface could be created, maintained and/or deployed by a service provider that offers the functions described herein for customers. That is, a service provider could offer to provide a rules wizard as described above.

It is understood that the systems, functions, mechanisms, methods, engines and modules described herein can be implemented in hardware, software, or a combination of hardware and software. They may be implemented by any type of computer system or other apparatus adapted for carrying out the methods described herein. A typical combination of hardware and software could be a general-purpose computer system with a computer program that, when loaded and executed, controls the computer system such that it carries out the methods described herein. Alternatively, a specific use computer, containing specialized hardware for carrying out one or more of the functional tasks of the invention could be utilized. In a further embodiment, part of all of the invention could be implemented in a distributed manner, e.g., over a network such as the Internet.

The present invention can also be embedded in a computer program product, which comprises all the features enabling the implementation of the methods and functions described herein, and which—when loaded in a computer system—is able to carry out these methods and functions. Terms such as computer program, software program, program, program product, software, etc., in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

The foregoing description of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of this invention as defined by the accompanying claims.

The invention claimed is:

1. A system for generating content rules for a Web application server, comprising:
   a computing device including:
   a content manager for receiving a selected content item by a user; and
   a segment manager for enabling the user to define a segment of customers to associate with the selected content item wherein the segment of customers is less than all the customers in a customer database, wherein the segment manager provides the selected content item for display to the segment of customers and generates a multifaceted search interface for enabling the user to define the segment of customers based on previously collected customer data in the customer database including customer type and previous customer order history, wherein customers purchase goods/services associated with the selected content item, wherein the segment of customers is defined as a business having a number of employees within a predefined range.

2. The system of claim 1, wherein the selected content item is selected from the group consisting of: an advertisement, multimedia data, text and an image.

3. The system of claim 1, wherein the multifaceted search interface is coupled to a multifaceted search engine that can access data from a user database associated with the Web application server.

4. The system of claim 1, further comprising a plan definition system for defining a plan for the selected content item and the segment of customers.

5. The system of claim 4, wherein the plan is converted into at least one rule for the Web application server.

6. The system of claim 1, further comprising a content placement system for selecting an area in a Web page to locate the selected content item.

7. The system of claim 1, further comprising an analysis system for displaying statistics regarding the selected content item.

8. The system of claim 1, wherein the segment manager includes a system for creating a new segment of customers for all visitors not currently associated with a segment of customers.

9. A computer program product embodied in at least one non-transitory computer readable medium, comprising:
   program code configured for generating a first user interface for selecting a content item; and
   program code configured for generating a second user interface for defining a segment of customers to associate with a selected content item wherein the segment of customers is less than all the customers in a customer database, wherein the second user interface displays the selected content item to the segment of customers and includes a multifaceted search interface for defining the segment of customers based on previously collected customer data in the customer database including customer type and previous customer order history wherein customers purchase goods/services associated with the selected content item, wherein the segment of customers is defined as a business having a number of employees within a predefined range.

10. The program product of claim 9, wherein the content item is selected from the group consisting of: an advertisement, text, an image, and a multimedia object.

11. The program product of claim 9, wherein the multifaceted search interface is coupled to a multifaceted search engine that can access data from a user database associated with the Web application server.

12. The program product of claim 9, further comprising program code configured for generating a third user interface for defining a plan for the selected content item and the defined segment of customers.

13. The program product of claim 12, wherein the plan is converted into at least one rule for the Web application server.

14. The program product of claim 9, further comprising program code configured for generating a fourth user interface for selecting an area in a Web page to locate the selected content item.

15. The program product of claim 9, further comprising program code configured for displaying statistics regarding the selected content item.

16. The program product of claim 9, wherein the program code configured for generating a second user interface for defining a segment of customers includes a system for creating a new segment of customers for all users not currently associated with a segment of customers.

17. A computer-implemented method for generating content rules for a Web application server, comprising:
   receiving a selected content item within a user interface;
   enabling a user to define a segment of customers based on previously collected customer data in a customer database including customer type and previous customer order history to associate with a selected content item by generating a multifaceted search interface that navigates data from within a database associated with the Web application server by providing the selected content item for display to the segment of customers, wherein the segment of customers is less than all the customers in a customer database; and
   generating at least one rule for the Web application server based on the selected content item and the segment of customers wherein customers purchase goods/services associated with the selected content item, wherein the segment of customers is defined as a business having a number of employees within a predefined range.

18. The method of claim 17, wherein the content item is selected from the group consisting of an advertisement, text, an image and a multimedia object.

19. The method of claim 17, wherein the multifaceted search interface is coupled to a multifaceted search engine that can access data from a user database associated with the Web application server.

20. The method of claim 17, comprising a further step of defining a plan for the selected content item and defined segment of customers.

21. The method of claim 17, comprising a further step of selecting an area in a Web page to locate the selected content item.

22. The method of claim 17, comprising a further step of displaying statistics regarding the selected content item.

23. The method of claim 17, comprising a further step of defining a data segment including a system for creating a new segment of customers for all users not currently associated with the segment of customers.

24. A computer-implemented method for deploying an application for generating content rules for a Web application server, comprising:

providing a computer infrastructure being operable to:

generate a first user interface for selecting a content item; and generate a second user interface for enabling a user to define a segment of customers based on previously collected customer data in a customer database including customer type and previous customer order history to associate with the selected content item, wherein the second user interface generates a multifaceted search interface for enabling the user to define the segment of customers and wherein the second user interface provides the selected content item for display to the segment of customers wherein customers purchase goods/services associated with the selected content item, wherein the segment of customers is less than all the customers in a customer database, wherein the segment of customers is defined as a business having a number of employees within a predefined range.

* * * * *